(12) United States Patent
Chow et al.

(10) Patent No.: US 10,181,979 B2
(45) Date of Patent: Jan. 15, 2019

(54) INTER-NETWORK POLICY

(71) Applicant: California Institute of Technology, Pasadena, CA (US)

(72) Inventors: Edward T. Chow, Covina, CA (US); Farrokh Vatan, West Hills, CA (US); George K. Paloulian, Pasadena, CA (US); Stephen A. Frisbie, San Diego, CA (US); Vasilios Kalomiris, Williamsburg, CA (US)

(73) Assignees: CALIFORNIA INSTITUTE OF TECHNOLOGY, Pasadena, CA (US); THE UNITED STATES OF AMERICA AS REPRESENTED BY THE SECRETARY OF THE NAVY, Washington, DC (US); THE UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 402 days.

(21) Appl. No.: 14/078,256

(22) Filed: Nov. 12, 2013

(65) Prior Publication Data
US 2014/0136676 A1    May 15, 2014

Related U.S. Application Data

(60) Provisional application No. 61/724,832, filed on Nov. 9, 2012.

(51) Int. Cl.
*G06F 15/173* (2006.01)
*H04L 12/24* (2006.01)
*H04L 12/915* (2013.01)

(52) U.S. Cl.
CPC ........ *H04L 41/0893* (2013.01); *H04L 47/785* (2013.01)

(58) Field of Classification Search
CPC .. H04L 47/785; H04L 41/089; H04L 41/0246
USPC ......................................................... 709/223
See application file for complete search history.

(56) References Cited

U.S. PATENT DOCUMENTS

| | | | | |
|---|---|---|---|---|
| 6,765,864 B1* | 7/2004 | Natarajan | ............... | H04L 41/06 370/224 |
| 8,131,831 B1* | 3/2012 | Hu | ......... | H04M 15/43 379/201.03 |
| 8,140,666 B2* | 3/2012 | Dias | ..................... | H04L 12/5695 370/252 |
| 2002/0010798 A1* | 1/2002 | Ben-Shaul | .......... | G06F 17/3089 709/247 |
| 2007/0064604 A1* | 3/2007 | Chen | ..................... | H04L 1/0002 370/230 |

(Continued)

*Primary Examiner* — David R Lazaro
*Assistant Examiner* — Mariegeorges A Henry
(74) *Attorney, Agent, or Firm* — Gates & Cooper LLP

(57) ABSTRACT

Various embodiments associated an inter-network policy that is implemented for use across multiple networks are described. Individual networks can have individual policies that govern how communications are handled, how resources are allocated, and other metrics. When individual networks work together, these networks can experience problems if their individual policies conflict with one another. Therefore, the inter-network policy can be generated that facilitates the individual networks working together.

20 Claims, 16 Drawing Sheets

(56) References Cited

U.S. PATENT DOCUMENTS

| | | | |
|---|---|---|---|
| 2008/0183977 A1* | 7/2008 | Gower | G06F 12/0215 711/154 |
| 2009/0238078 A1* | 9/2009 | Robinson | G06Q 10/06 370/241 |
| 2009/0327476 A1* | 12/2009 | Grell | G06Q 40/00 709/224 |
| 2011/0082723 A1* | 4/2011 | Governatori | G06Q 10/06398 705/7.42 |
| 2012/0034916 A1* | 2/2012 | Hu | H04W 28/24 455/432.1 |
| 2012/0131594 A1* | 5/2012 | Morgan | G06F 9/5072 718/105 |
| 2012/0196644 A1* | 8/2012 | Scherzer | H04W 72/02 455/524 |
| 2012/0303823 A1* | 11/2012 | Nair | H04W 48/18 709/227 |

* cited by examiner

INTER-NETWORK POLICY

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 61/724,832, filed on Nov. 9, 2012, by Edward T. Chow, Farrokh Vatan, George K. Paloulian, Stephen A. Frisbie, and Vasilios Kalomiris, entitled "Inter-Network Policy".

STATEMENT REGARDING FEDERALLY SPONSORED RESEARCH AND DEVELOPMENT

The invention described herein was made in the performance of work under a NASA contract, and is subject to the provisions of Public Law 96-517 (35 USC 202) in which the Contractor has elected to retain title.

BACKGROUND OF THE INVENTION

1. Field of the Invention

The present invention relates generally to communication, and in particular, to a method, apparatus, and article of manufacture for enabling dynamic communication between different networks having different communication policies.

2. Description of the Related Art

In a military environment, different forces working together can function on a battlefield. These forces can have a desire to share information with one another, share resources, and perform other tasks together. This type of collective arrangement can provide fruitful results. However, due to language barriers, differences in priorities among forces, and other factors, these different forces can have different policies that govern their individual networks. These policies can have conflicting aspects which makes it difficult if not impossible for networks to work together.

In view of the above, in the prior art, an inter-force inter-domain service level agreement (SLA) is established manually through time consuming pre-planning processes. Such pre-planning includes establishing an overall operational traffic management policy, developing and testing technical configurations, and iterating until performance is acceptable. However, the complexity of communications and networks (C&N) is increasing resulting in a heavy management burden for intra force C&N as well as inter-force C&N. Accordingly, it is desirable to provide a tool that can dynamically resolve policy differences between disparate forces in an automated manner.

SUMMARY OF THE INVENTION

A system comprising a generation component and an implementation component is described. The generation component is configured to proactively generate an inter-network policy that governs a relationship between two or more networks (e.g., a first network and a second network), where the inter-network policy resolves a difference set between the policies of the different networks (e.g., between a policy of the first network and a policy of the second network) and where the networks are different networks. The implementation component is configured to cause the inter-network policy to implement for the two or more networks concurrently, wherein a processor executes an instruction that pertains to at least one of the generation component, the implementation component, or a combination thereof.

In addition, a system comprising a processor and a non-transitory computer-readable medium configured to store computer-executable instructions that when executed by the processor cause the processor to perform a method is described. The method comprises generating an inter-network policy, where the inter-network policy governs resource usage between two or more networks (e.g., the first network and the second network), where the inter-network policy resolves a difference set between the policies of the networks, wherein the networks (e.g., the first network and second network) are at least partially different networks, wherein the inter-network policy is not identical to the policy of any of the networks (e.g., the first network and/or the second network). The method also comprises causing the inter-network policy to implement for the different networks concurrently. The method further comprises causing an interface to be disclosed to the first network, wherein the interface provides information on use of a resource of the second network in accordance with the inter-network policy and where the interface forces command input in accordance with the inter-network policy.

Further, a non-transitory computer-readable medium configured to store computer-executable instructions that when executed by the processor cause the processor to perform a method is described. The method comprises generating a provisional inter-network policy for communication between two or more networks (e.g., a first network and a second network) and also comprises gathering a feedback from the first network, where the feedback is for the provisional inter-network policy. The method further comprises gathering a feedback from the other (e.g., second) networks, where the feedback is for the provisional inter-network policy. In addition, the method comprises analyzing the feedback from the two or more networks to produce a feedback analysis result. The method also comprises generating a inter-network policy that governs communication between the two or more networks. The inter-network policy resolves a difference set between the policies of the different networks and is based, at least in part, on the feedback analysis result. Further, the first network may be prevented from accessing at least part of the policy of the second (or more) network(s) while the inter-network policy is implemented. Additionally, the method comprises collecting a confirmation from the first network and the other networks (e.g., the second network) that consists of an approval to use the inter-network policy. The method also comprises causing the inter-network policy to implement for the multiple networks concurrently in response to collection of the confirmation from the networks.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

Figure 1:
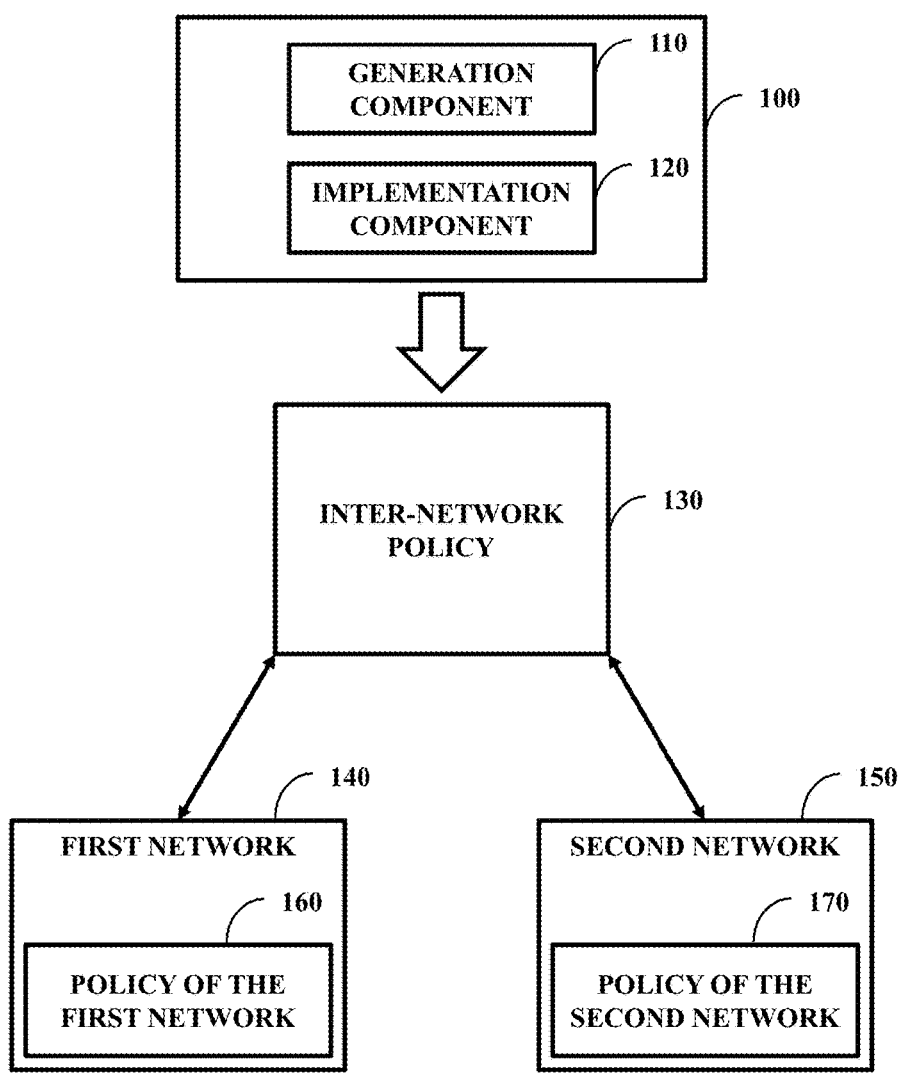
FIG. 1 illustrates one embodiment of a system comprising a generation component and an implementation component.

In the resource negotiation stage, the needed resources are evaluated and negotiated and then allocated in the resource allocation stage.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a dynamic policy negotiation system that transforms the manual service level agreement process to an automated inter-domain machine-to-machine negotiation process. Such a system enables ad-hoc interoperable communications in the battlefield between force domains, without pre-planning (prior art force laydowns are static in the field), enables rapid re-negotiation of service level agreements based on dynamic battlefield conditions (e.g., seconds and not weeks), and reduces dependence on "white coats" in the field which are necessary in the prior art to support complex systems.

Dynamic Policy Negotiation Flow

Systems, methods and other embodiments disclosed herein are related to an inter-network policy. Individual networks can have individual policies that govern how communications are handled, how resources are allocated, and other matters. When individual networks work together, these networks can experience problems if their individual policies conflict with one another. Therefore, an inter-network policy is needed that facilitates the individual networks working together.

While an inter-network policy can be generated manually, manual generation can be a time and labor intensive process. In addition, manual generation can bring a human element into making difficult decisions about matters that relate to the inter-network policy, such as resource allocation. Therefore, embodiments of the invention automatically generate the inter-network policy. This automatic generation can include evaluation of individual policies of individual networks, and based on those individual policies, the inter-network policy can be produced.

While some examples disclosed herein relate to military applications, it is to be appreciated by one of ordinary skill in the art that aspects disclosed herein can be practiced in a variety of applications. For example, the inter-network policy can be generated for use among different business networks (e.g., networks of one company, networks of different companies, networks of competing companies, etc.), personal networks, among business and personal networks, and others.

The following includes definitions of selected terms employed herein. The definitions include various examples. The examples are not intended to be limiting.

"One embodiment," "an embodiment," "one example," "an example," and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium," as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component," as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software," as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a system 100 comprising a generation component 110 and an implementation component 120. The generation component 110 is configured to proactively (e.g., automatically, without user action, etc.) generate an inter-network policy 130 (e.g., a service level agreement) that governs a relationship between a first network 140 and a second network 150, where the first network 140 and the second network 150 are different networks. The inter-network policy 130 resolves a difference set between a policy of the first network 160 and a policy of the second network 170. The implementation component 120 is configured to cause the inter-network policy 130 to be utilized concurrently for the first network 140 and the second network 150 (e.g., the first network 140 and the second network 150 can use the inter-network policy 130 at the same time). While inter-network policy 130 is discussed governing the relationship between the first network 140 and the second network 150, it is to be appreciated by one of ordinary skill in the art that along with the first network 140 and second network 150, the inter-network policy 130 can govern a relationship with a third network (e.g., between the third network and first network 140, collectively among the first network 140 and the second network 150, etc.), a fourth network, etc.

In one example, the first network 140 can be a computer network of a first military force and the second network 150 can be a computer network of a second military force. The military forces can desire to communicate with one another. However, network policies for each of these military forces can be different and these differences can cause major difficulties in communicating with one another, completing an objective, and other situations. Therefore, the system 100 can function to proactively generate the inter-network policy 130 that manages these differences.

In one embodiment, the difference set (e.g., one or more differences) comprises a difference between a first communication priority of the first network 140 and a first communication priority of the second network 150. For example, the policy 160 can give a communication of type 'A' a first priority while the policy 170 can give a communication of type 'B' a first priority. The inter-network policy 130 can be structured such that a communication of type 'A' is a first priority while a communication of type 'B' is a second priority. Therefore, a policy element of one of the networks, here the policy element of the policy 160, can become the policy element of the inter-network policy 130.

In a more concrete example, the first network 140 can be a network of a medical unit and due to this the policy 160 can give a first priority to communications that relate to a wounded soldier. In contrast, the second network 150 can be a network of a supply unit and due to this, the policy 170 can give a first priority to communications that relate to shortages in supplies. In generating the inter-network policy 130, the generation component 110 can decide what to do if a wounded soldier message and supply shortage message are to be sent at the same time and resources are limited such that the messages are to be sent one after the other. The generation component 110 can use an algorithm/methodology to determine that wounded soldier messages are more important than supply shortage messages and generate the inter-network policy 130 to reflect this importance. Therefore, if a wounded soldier message and a supply shortage message are asked to be sent at the same time (e.g., to a central location), then the wounded soldier message can be sent first followed by the supply shortage message when the inter-network policy is implemented.

While having a policy element of one of the policies 160 or 170 can be performed, it is also possible for the inter-network policy 130 to have a policy element that is different from a corresponding element of either policy 160 or 170. For example, a first company can run the first network 140 and a second company can run the second network 150. These companies can reside in a single office building and leverage their networks off one another. In this example, the companies can each have their fiscal year end at a different time and therefore a single company can benefit from added resources of a network of the other company when work becomes busy. The policy 160 can treat major client messages (e.g., top three clients in gross sales) and mid-major client messages (e.g., fourth through tenth clients in gross sales) with a highest priority (e.g., major and mid-major client messages are given highest placement in their queue). In contrast, policy 170 can treat messages from first level senior staff members (e.g., Chief Executive Officer, Chief Financial Officer, Chief Operating Officer, etc.) and second level senior staff members (e.g., vice presidents) of the second company as those with the highest priority (e.g., senior staff member messages are given highest placement in their queue). The generation component 110 can proactively generate the inter-network policy 130 such that messages from major clients and first level senior staff members are given first priority while messages from mid-major clients and second level senior staff members are given second priority. Thus, the inter-network policy 130 balances priorities of the first network 140 and the second network 150 while having a policy element that is different form a corresponding element in the polices 160 or 170.

In one embodiment, the inter-network policy 130 comprises a rule that regulates use of a resource of the first network 140 by the second network 150. The first network 140 and second network 150 can have resources that are made available to one another and the inter-network policy 130 can be used to manage use of those resources. For example, two families can have houses next to one another. A first family's house can use a first computer network that is the first network 140 and a second family's house can use a second computer network that is the second network 150. The families can have one teenage child apiece with the computer networks having two units of bandwidth apiece. The policy 160 can allocate both units of first network bandwidth to the child of the first family and policy 170 can allocate both units of second network bandwidth to the child of the second family. The inter-network policy 130 can be constructed such that if both children are watching a movie streamed from the Internet (e.g., performing equal actions), then policies 160 and 170 apply. However, if the child of the first family is doing research for a school assignment and the child of the second family is watching the movie streamed from the Internet (e.g., one child performing an action considered more important than an action of another child), the inter-network policy 130 can allocate three units of bandwidth to the child of the first family and one unit of bandwidth to the child of the second family. Thus, the inter-network policy 130 can regulate resource allocation based, at least in part, on a task performed by a network.

In one embodiment, the first network 140 follows the policy of the first network 160 for a first network intra-network communication when the inter-network policy 130 is implemented. The first network 140 can follow the inter-network policy 130 for an inter-network communication (e.g., communication with the second network 150 or other network) when the inter-network policy 130 is implemented when the policy of the first network 160 and the inter-network policy 130 are not identical. Therefore, the inter-network policy 130 generated by the generation component 110 can be restricted to out-of-network matters while individual network policies, that can presumably be more favorable to an individual network, govern in-network matters.

Figure 2:
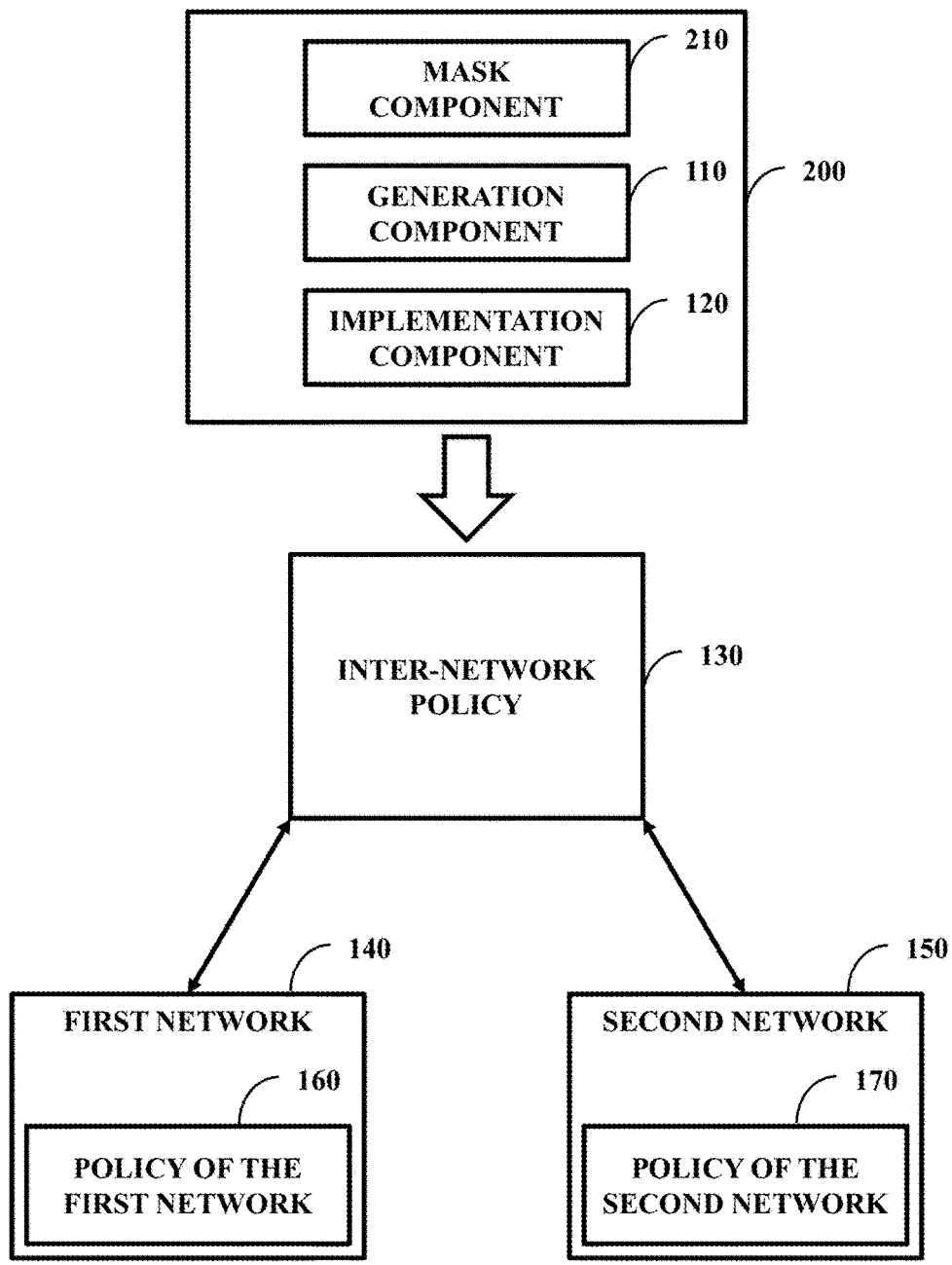
FIG. 2 illustrates one embodiment of a system comprising a mask component, the generation component, and the implementation component.

FIG. 2 illustrates one embodiment of a system 200 comprising a mask component 210, the generation component 110, and the implementation component 120. The mask component 210 is configured to prevent the first network 140 from accessing at least part of the policy of the second network 170 while the inter-network policy 130 is implemented. The mask component 210 can be configured to prevent the second network 150 from accessing at least part of the policy of the first network 160 while the inter-network policy 130 is implemented concurrent with prevention of the first network 140 from accessing at least part of the policy of the second network 170 while the inter-network policy is implemented. Thus, prevention of information access can be uni-directional or multi-directional.

While the first network 140 and the second network 150 may work together, there still may be a desire to keep information about one another a secret and prevent this information from being accessed. For example, the first network 140 can be for a military unit of a first nation while the second network 150 can be for a military unit of a second nation. The first nation and the second nation can be allied together fighting against a common enemy. However, these nations can still desire to keep secrets from one another despite their alliance. Once of these secrets can be specific details of their individual communication policies. Therefore, the mask component 210 can function to prevent one side (e.g., the first network 140) from accessing a policy of another side (e.g., the policy of the second network 150). The mask component 210 can prevent information dissemination as well, such as access of computer-storage of a network, content of communications from a network to an out of network location (e.g., from the first network 140 to a location not of the second network 150), etc.

In an example of uni-directional information access prevention, the first network 140 can be run by a law firm and the second network 150 can be run by a client that hires the law firm for legal matters. The client can desire to provide full access to the policy 170 as well as other information to the law firm so the law firm can represent the client as well as possible. However, the policy 160 for the law firm can include information on other clients represented by the law firm and the law firm can desire to keep this information secret. Therefore, the mast component 210 can mask the policy 160 to the client, but the policy 170 can be available to the law firm.

The mask component 210 can function in different manners to cause this prevention. In one embodiment, the mask component 210 can work with the generation component 110 such that the inter-network policy 130 is generated to prevent the first network 140 from accessing the policy of the second network 170 (or other aspect of the second network 150). In one embodiment, the generation component 110 first produces the inter-network policy 130 and then the implementation component 120 cause the inter-network policy 130 to be implemented. Once implemented, the first network 140 and the second network 150 can use the inter-network policy 130. The mask component 210 can monitor and/or manage use of the inter-network policy 130. If the first network 140 attempts to access the policy of the second network 170, then the mask component 210 can prevent this access from occurring. In one embodiment, the generation component 110 generates the inter-network policy 130, the mask component 210 modifies the inter-network policy 130 to achieve desired masking, and then the implementation causes the inter-network policy 130 to implement as modified.

Figure 3:
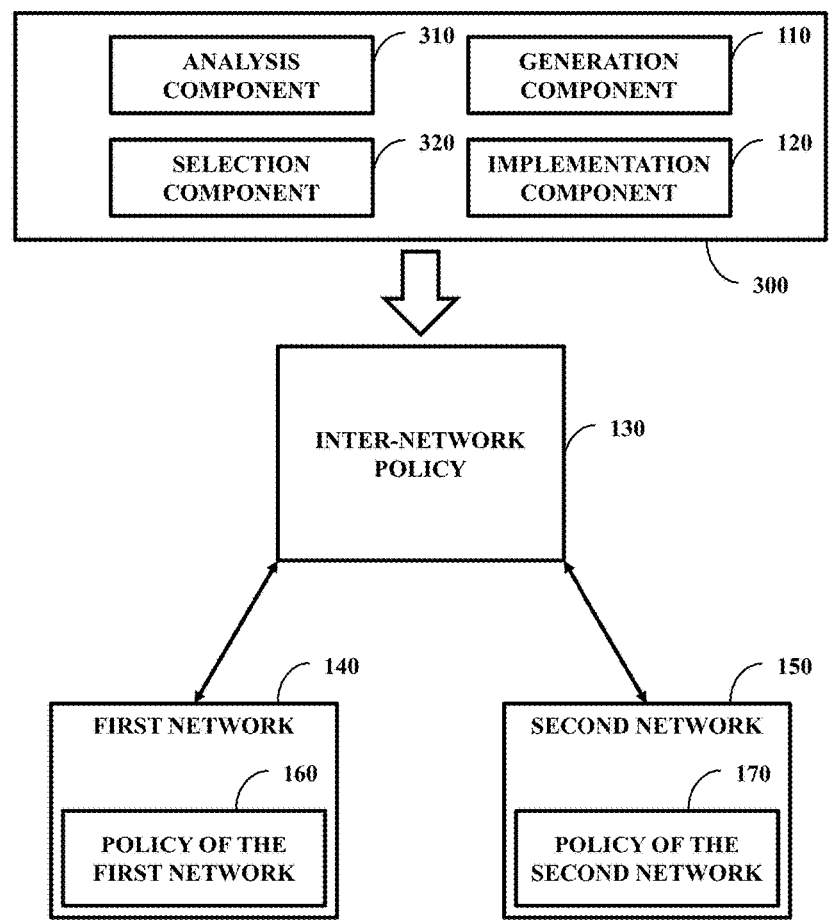
FIG. 3 illustrates one embodiment of a system comprising an analysis component, a selection component, the generation component, and the implementation component.

FIG. 3 illustrates one embodiment of a system 300 comprising an analysis component 310, a selection component 320, the generation component 110, and the implementation component 120. The analysis component 310 is configured to perform an analysis of the policy of the first network 160 and of the policy of the second network 170. The selection component 320 is configured to make a selection of a content of the inter-network policy 130. The selection of the content is based, at least in part, on a result of the analysis. The generation component 110 proactively generates the inter-network policy 130 with the content.

Artificial intelligence techniques, algorithms, and others can be used by the system 300 to determine the content of the inter-network policy 130. In one embodiment, the selection component 320 can enter into negotiations with the first network 140 and the second network 150 to select content for the inter-network policy 130. In one embodiment, the selection component 320 can use at least one scoring function to evaluate different policy elements of the policies 160 and 170 and based on the outcome of the scoring function the inter-network policy 130 can be generated. In one embodiment, the first network 140 and the second network 150 can propose bids for the inter-network policy 130, with the bids detailing suggested content, prioritizing portions of the policies 160 and 170 (e.g., the first network 140 prioritizes elements of the policy 160), etc. The analysis component 310 can analyze these bids and the result from this analysis can be used by the selection component 320 to select the content.

In one embodiment, the content comprises a traffic flow agreement for regulation of traffic among the first network 140 and the second network 150. An example traffic flow agreement can be priorities given to different communications from the first network 140 and the second network 150 (e.g., priority based on individual sender, priority based on communication content, priority based on time sent, priority based on priority status given with the communication, etc.). In one embodiment, the content comprises capability information of the first network 140 that is available to the second network 150 and capability information of the second network 150 that is available to the first network 140. In one embodiment, capability information is available for the first network 140 and not the second network 150. The inter-network policy 130 can govern access and/or use of a resource of the second network 150 by the first network 140. Thus, the content can comprise resource access regulation and/or resource usage regulation. The inter-network policy 130 can include resource information of the first network 140 and this resource information can be made available to the second network 150. This resource information can be part of the capability information discussed above.

In one embodiment, the content comprises a policy element of the inter-network policy 130, where the policy element of the inter-network policy 130 differs from a corresponding policy element of the policy of the first network 160 and where the policy element of the inter-network policy 130 differs from a corresponding policy element of the policy of the second network 150. The policies 160 and 170 can have specific policy elements that handle specific situations. For example, policy 160 can dedicate 30% of first network communication lines, 3 out of 10, to secure communications while policy 150 can dedicate 60% of second network communication lines, 6 out of 10, to secure communications. The selection component 320 can evaluate the policies 160 and 170 as well as other information and determine that dedicating 40% of communication lines, 8 out of 20, would be a beneficial allocation for secure and non-secure communications (e.g., based on expected amount of secure communications, maximum load expectations, etc.). Therefore, the policy element selected for the inter-network policy 130, 40%, is different than the corresponding policy elements for the policy 160, 30%, and for the policy 170, 60%.

In one embodiment, the content comprises a policy element of the inter-network policy 130 where the policy element of the inter-network policy 130 is the same as a policy element of the policy of the first network 140. The policy element of the policy of the first network 160 has a difference that is part of the difference set with a corresponding policy element of the policy of the second network 170. Using the example from the previous paragraph with secure communication lines, the selection component 320 can select the policy element of the inter-network policy 130 to be 30%, 6 out of 20, that is equal to that of the corresponding policy element of the policy 160, but not of the corresponding policy element of the policy 170.

In one embodiment, the selection component 320 employs an algorithm to make a determination of an optimal content for the content of the inter-network policy 130. The determination is based, at least in part, on the policy of the first network 160 and the policy of the second network 170. The selection component 320 is configured to make a selection of optimal content as the content of the inter-network policy 130.

Figure 4:
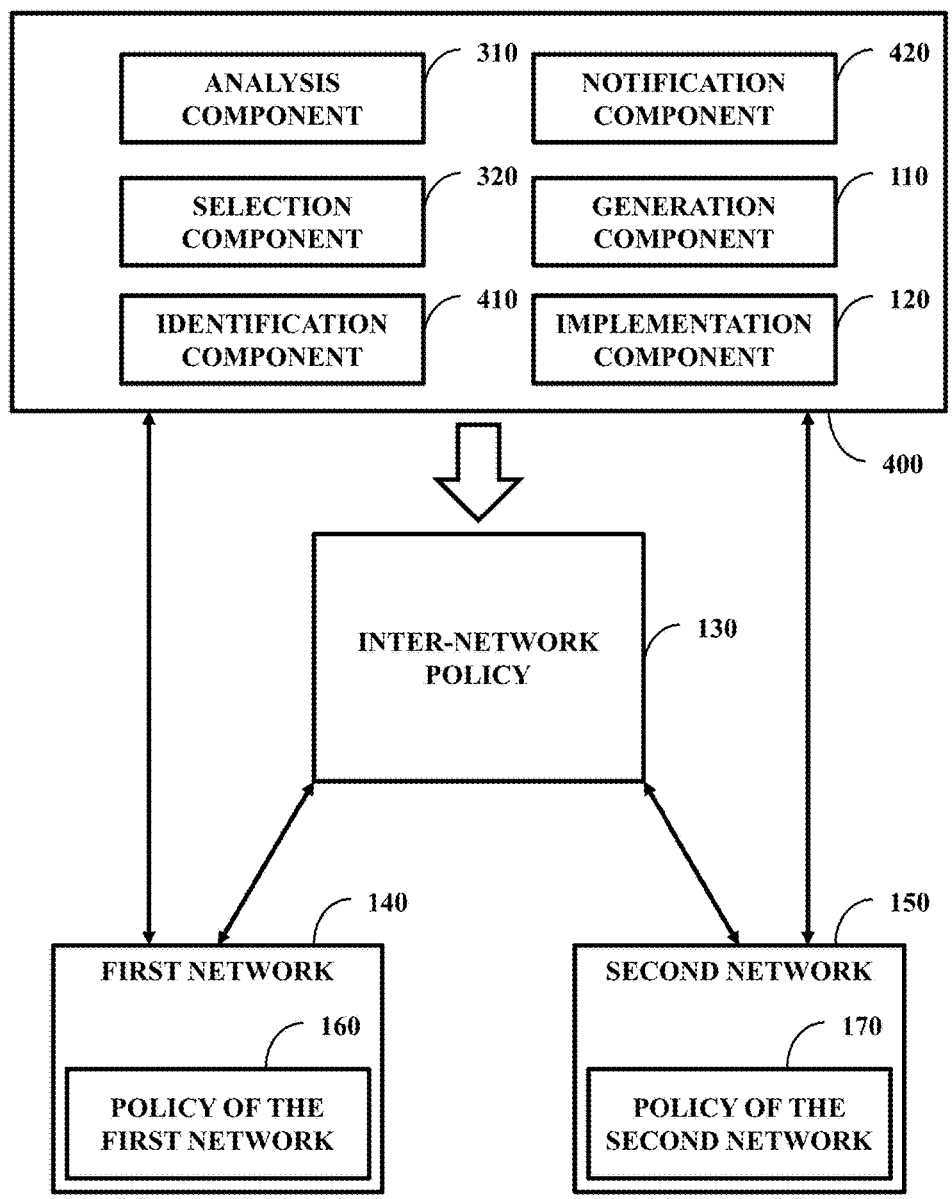
FIG. 4 illustrates one embodiment of a system comprising the analysis component, the selection component, an identification component, a notification component, the generation component, and the implementation component.

FIG. 4 illustrates one embodiment of a system 400 comprising the analysis component 310, the selection component 320, an identification component 410, a notification component 420, the generation component 110, and the implementation component 120. The identification component 410 is configured to perform an identification of a difference of the difference set that is irresolvable by the generation component 110. The result of the analysis by the analysis component 310 can be used to make the identification. The notification component 420 is configured to produce a notification that includes information on the difference of the difference set that is irresolvable by the generation component 110.

With this irresolvable situation, the inter-network policy 130 can be generated in an incomplete form. In this form, the implementation component 120 can implement the inter-network policy 130 or can wait until the irresolvable situation is rectified and then implement the inter-network policy 130. A rectification can be received by the implementation component 120 and the implementation component 120 can implement the rectification (e.g., modify the inter-network policy 130 that is implemented in the incomplete form, change the inter-network policy 130 that has not been implemented to correct for the irresolvable situation and then implement the inter-network policy 130, re-issue the inter-network policy 130 in a corrected form, etc.).

The inter-network policy 130 is configured to be created proactively. For example, a user or network element can request for the inter-network policy 130 to be created and the generation component 110, in response to this request, can proactively create the inter-network policy 130. This proactive creation can occur without user interaction such that after the request is made, the inter-network policy 130 is created automatically. However, an instance can occur where the generation component 110 is incapable of resolving a different. In this instance, the notification component 420 can cause notice to be delivered to at least one user that can resolve the difference.

For example, the policy 160 can have a requirement stating that communications of type 'X' must be given first priority. Policy 170 can have a requirement stating that communications of type 'Y' must be given first priority. The generation component 110 may not be able to resolve this difference since policies 160 and 170 in this example have requirements that cannot coexist. While in one embodiment the generation component 110 can override one of these requirements in another embodiment the generation component 110 may be unable to override one of these requirements or determine that making such an override would be undesirable. The identification component 410 can identify that these requirements conflict and an override should not occur. In response, the notification component 420 can produce a notification that requests users or other individuals to rectify the difference. In one example, the notification can be sent to the first network 140 and the second network 150 and the networks can route the notification to the proper authority. The proper authority can resolve the difference, information of the resolution can be sent to the system 400, and the implementation component 120 can cause the inter-network policy 130 to be implemented with the difference resolved.

Figure 5:
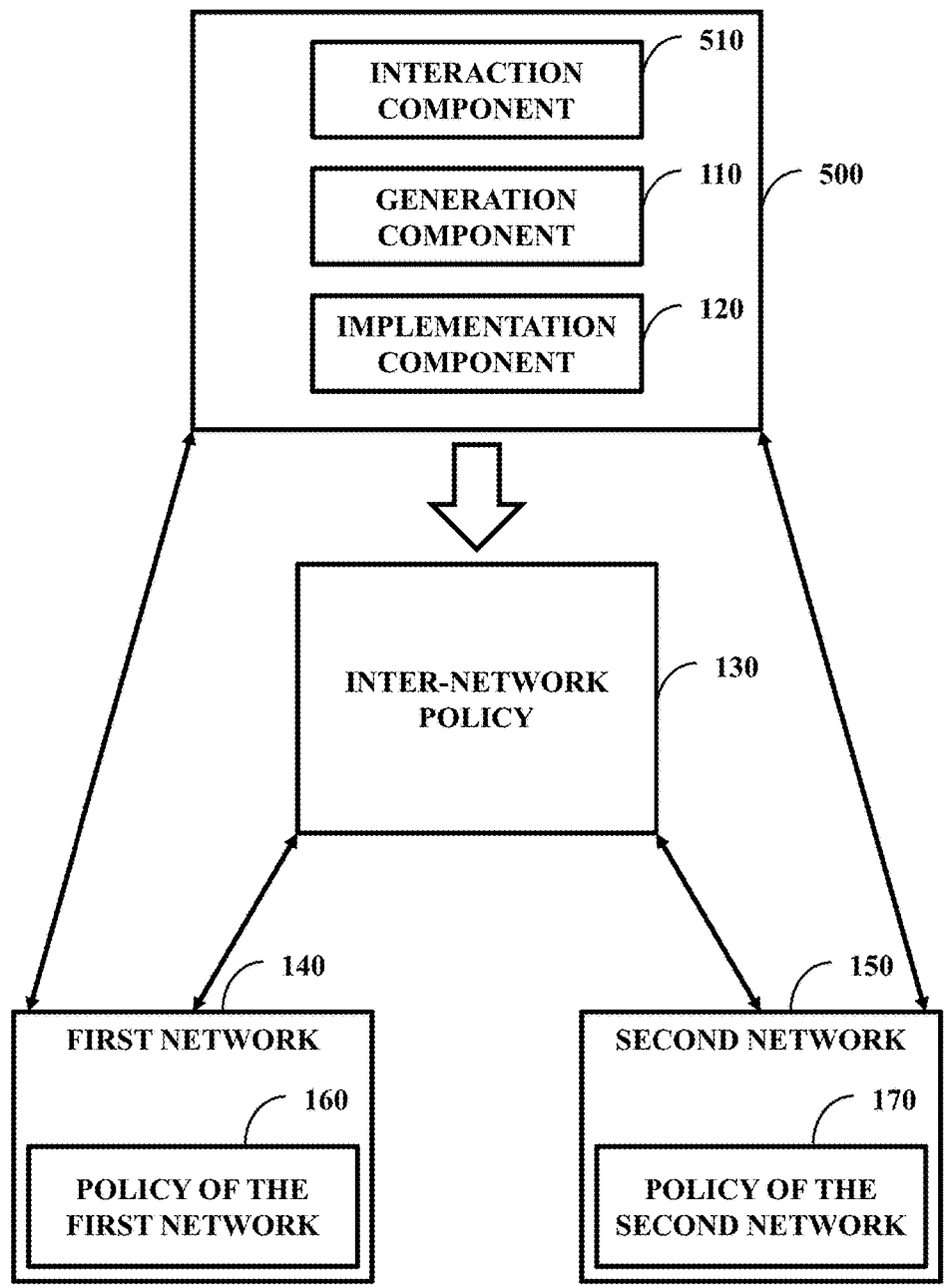
FIG. 5 illustrates one embodiment of a system comprising an interaction component, the generation component, and the implementation component.

FIG. 5 illustrates one embodiment of a system 500 comprising an interaction component 510, the generation component 110, and the implementation component 120. The interaction component 120 is configured to receive a first confirmation from the first network 140 and to receive a second confirmation from the second network 150. The implementation component 120 causes that inter-network policy 130 to implement for the first network 140 and the second network 150 concurrently in response to reception of the first confirmation and the second confirmation Since the inter-network policy 130 may be different from the policy of the first network 160 and/or the policy of the second network 170, it can be beneficial to have the first network 140 and the second network 150 approve of the use of the inter-network policy 130. The generation component 110 can generate the inter-network policy 130 and sent send the inter-network policy 130 to the first network 140 and the second network 150. The networks can evaluate the inter-network policy 130 against their own policies 160 and 170 and send confirmations to the system 500 that the inter-network policy 130 is acceptable. The interaction component 510 can receive these confirmations and in response to receiving these confirmations the implementation component 120 can cause the inter-network policy 130 to implement.

Figure 6:
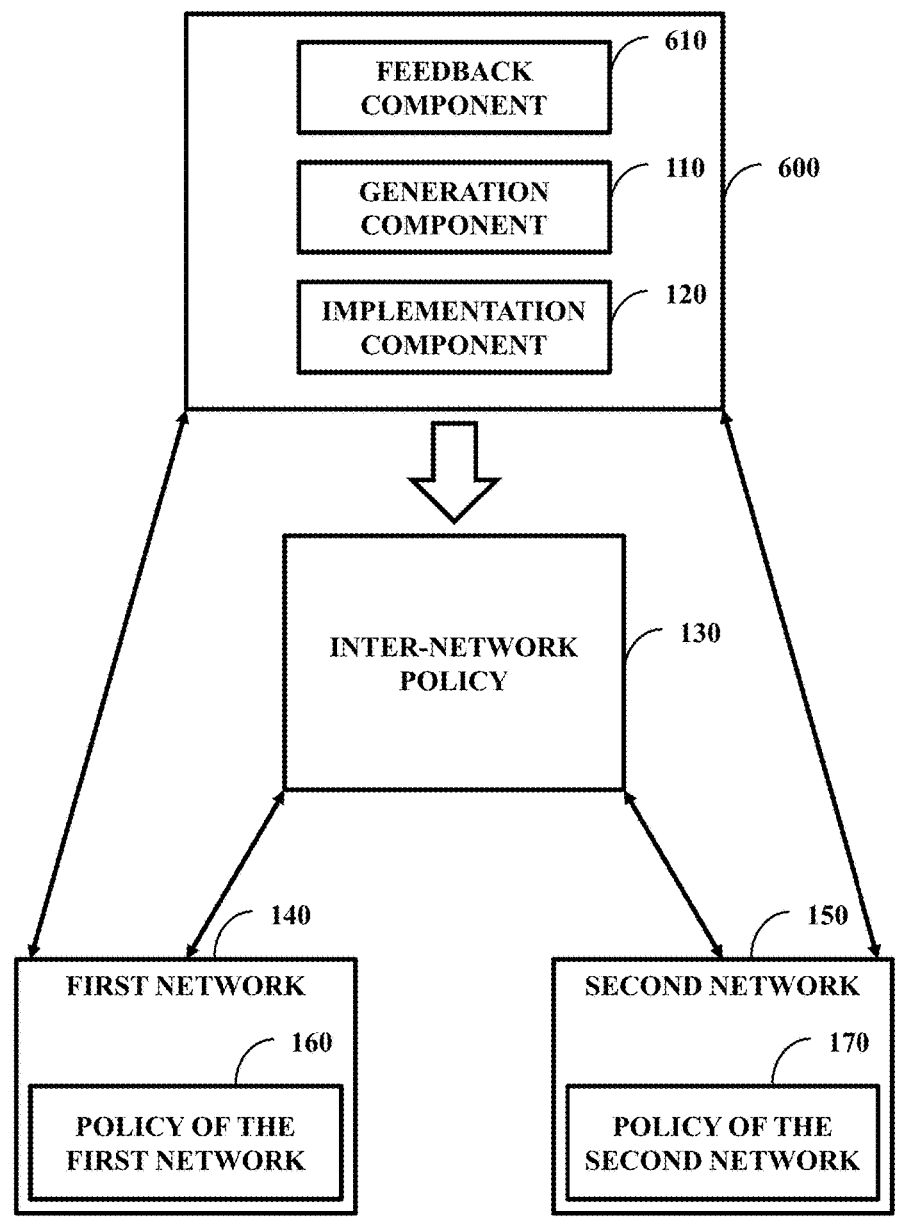
FIG. 6 illustrates one embodiment of a system comprising a feedback component, the generation component, and the implementation component.

FIG. 6 illustrates one embodiment of a system 600 comprising a feedback component 610, the generation component 110, and the implementation component 120. The feedback component 610 is configured to gather a first feedback from the first network 140 on a proposed internetwork policy. The feedback component 610 is also configured to gather a second feedback from the second network 150 on the proposed inter-network policy. The generation component 110 is configured to generate the proposed inter-network policy. In addition, the generation component 110 is configured to make a modification of the proposed inter-network policy in generation of the inter-network policy if appropriate. The modification can be based, at least in part, on the first feedback and the second feedback.

In one embodiment, the system 600 can function to negotiate with the first network 140 and the second network 150, where a result of this negotiation is used to generate the inter-network policy 130. This negotiation can be with automated elements of the first network 140 and second network 150 or with human elements. For example, the generation component 110 can send the proposed inter-network policy to the first network 140 and second network 150. These networks can evaluate the proposed policy against their own policies, policies 160 and 170, and recommend changes to the proposed policy. These recommended changes can be sent as the first feedback and the second feedback. The generation component 110 can modify the proposed policy or create a new inter-network policy based, at least in part, on at least some of the feedback to generate the inter-network policy 130. While discussed as a single iteration, it is to be appreciated by one of ordinary skill in the art that multiple feedback iterations can occur to generate the inter-network policy 130.

In one embodiment, the system 600 can work with the interaction component 510 of FIG. 5 with regard to feedback. For example, the generation component 110 can generate a first inter-network policy and send this first inter-network policy to the first network 140 and the second network 150. The first network 140 can provide confirmation of the first inter-network policy, but the second network 150 can reject the first network policy. Upon receiving the rejection, the interaction component 510 of FIG. 5 can solicit feedback from the second network on why confirmation is not given. The feedback component 610 can receive the solicited feedback and the generation component 110 can generate a second inter-network policy. The interaction component 510 can send the second inter-network policy to the networks 140 and 150 and the networks 140 and 150 can send confirmation. Upon receiving the confirmation the interaction component 510 can designate the second inter-network policy as the inter-network policy 130 and upon this designation being given the implementation component 120 can cause the second inter-network policy to be implemented as the inter-network policy 130.

Figure 7:
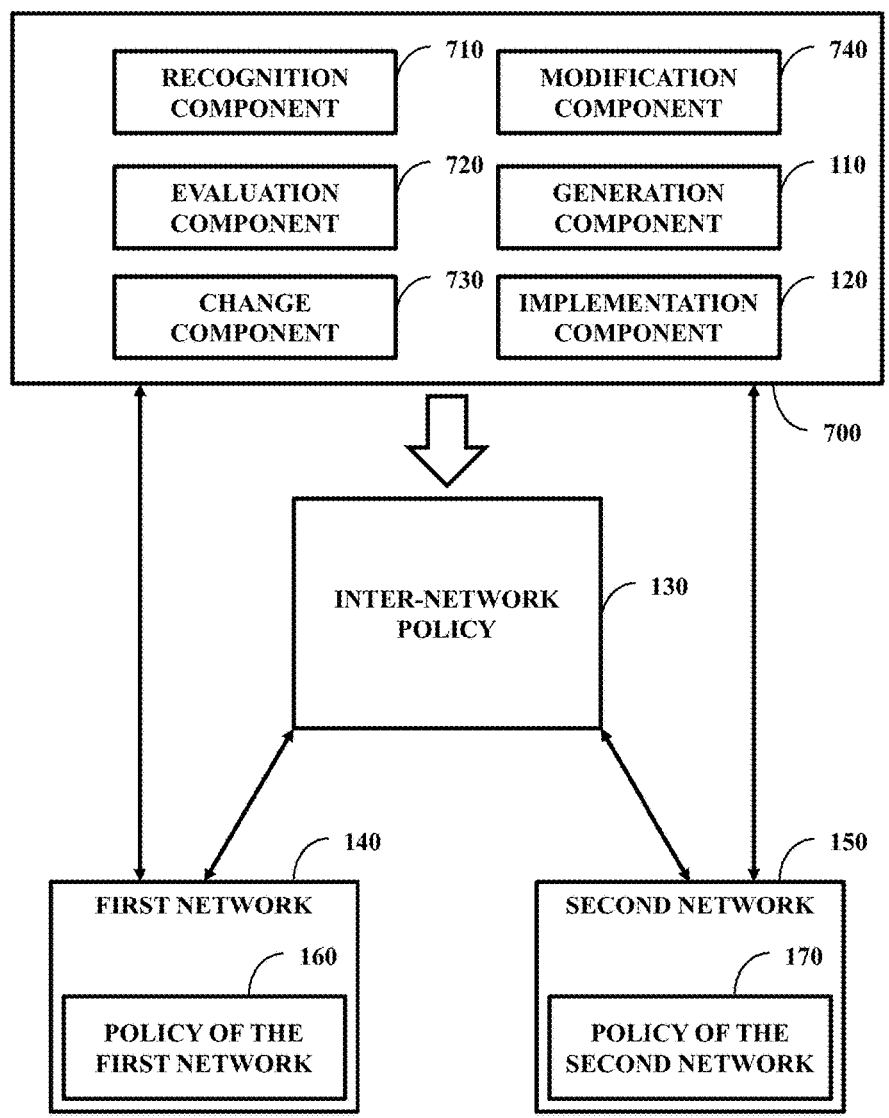
FIG. 7 illustrates one embodiment of a system comprising a recognition component, an evaluation component, a change component, a modification component, the generation component, and the implementation component.

FIG. 7 illustrates one embodiment of a system 700 comprising a recognition component 710, an evaluation component 720, a change component 730, a modification component 740, the generation component 110, and the implementation component 120. The recognition component 710 is configured to recognize a circumstance change for the first network 140, the second network 150, the policy of the first network 160, the policy of the second network 170, the inter-network policy 130, or a combination thereof. The evaluation component 720 is configured to perform an evaluation of the circumstance change on how the circumstance change impacts the inter-network policy 130. The change component 730 is configured to make a determination on if the inter-network policy 130 should be changed and is configured to make a determination on how to change the inter-network policy 130 in response to the determination on if the inter-network policy 130 should be changed being positive. The determination on if the inter-network policy 130 should be changed is based, at least in part, on a result of the evaluation while the determination on how to change the inter-network policy 130 is based, at least in part, on the result of the evaluation. The modification component 740 is configured to modify the inter-network policy 130 in accordance with the determination on how to change the inter-network policy 130.

The networks 140 and 150 can be evolving entities that experience changes, such as changes in how they are constructed (e.g., adding or removing elements), changes in the policies 160 and 170, as well as changes in environments in which they operate. The generation component 110 can generate the inter-network policy 130 with a specific confirmation in mind for the networks 140 and 150 as well as the policies 160 and 170. When the circumstance change occurs, the inter-network policy 130 can be ineffective, be error-prone, and experience other difficulties. Therefore, the system 700 can function to modify the inter-network policy 130 to account for the circumstance change.

In one example, the first network 140 can be part of a first military unit of a nation, the second network 150 can be part of a second military unit of the nation, and the inter-network policy 130 can be implemented on the networks 140 and 150. The first military unit can have access to five communication trucks and the second military unit can have access to five communication trucks. The generation component 110 can create the inter-network policy 130 to allow either military unit to access eight of the ten trucks at one time depending on circumstances. A commander can order three trucks of the second military unit to leave the second military unit and as such the trucks are no longer part of the second network. When these three trucks leave, the combined available trucks will be seven while the inter-network policy 130 allows for use of eight trucks. Thus, the inter-network policy 130 is outdated and should be changed. The recognition component 710 identifies that this circumstance change occurred and the evaluation component 720 identifies that three communication trucks left and can identify that the inter-network policy 130 is constructed for ten trucks, not seven. The change component 730 can determine that the inter-network policy 130 should be changed to allow either military unit to access six of the seven trucks. The modification component 740 can alter the inter-network policy 130 such that the inter-network policy 130 reflects the seven trucks instead of the ten trucks.

Components described herein as being separate can function as a single component. For example, the change component 730 and the selection component 320 of FIG. 3 can function as one component that selects content for the inter-network policy 130, whether that content is for a new inter-network policy 130 or content for a change to the inter-network policy 130. In another example, the modification component 740 and the generation component 120 can function as one component, where modification of the inter-network policy 130 can comprise generating a replacement inter-network policy (e.g., where the implementation component 120 causes the replacement inter-network policy to implement over an implemented inter-network policy) or altering the inter-network policy 130 once implemented.

Figure 8:
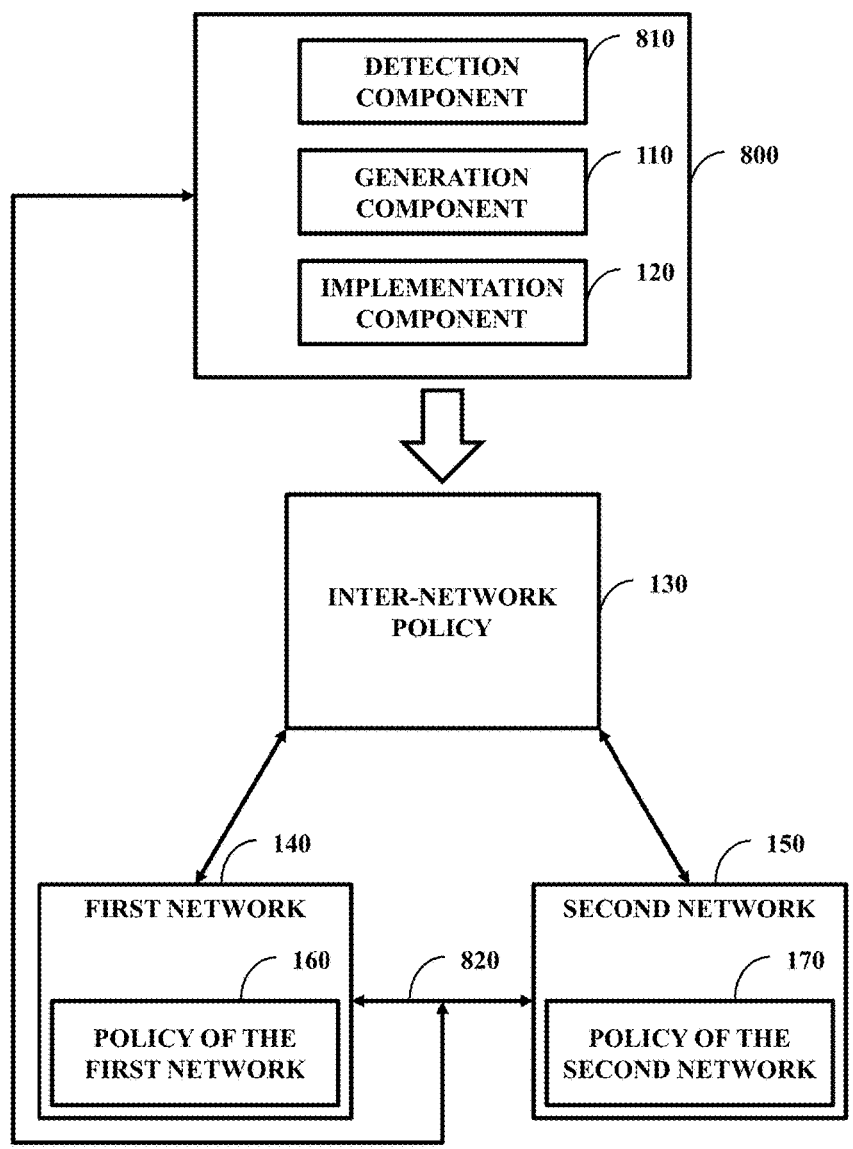
FIG. 8 illustrates one embodiment of a system comprising a detection component, the generation component, and the implementation component.

FIG. 8 illustrates one embodiment of a system 800 comprising a detection component 810, the generation component 110, and the implementation component 120. The detection component 810 is configured to detect a communication construct 820 between the first network 140 and the second network 150. The generation component 110 can be configured to operate in response to detection of the communication construct 820.

In one example, two military forces can be near one another fighting on the same side, the first military unit running the first network 140 and the second military unit running the second network 150. In one embodiment, the inter-network policy 130 will not be generated until the first network 140 and second network 150 communicate with one another. Until communication occurs between the networks 140 and 150, the networks 140 and 150 can use their policies 160 and 170 respectively. Once communication is identified by the detection component 810, the generation component 110 can function to generate the inter-network policy 130.

Figure 9:
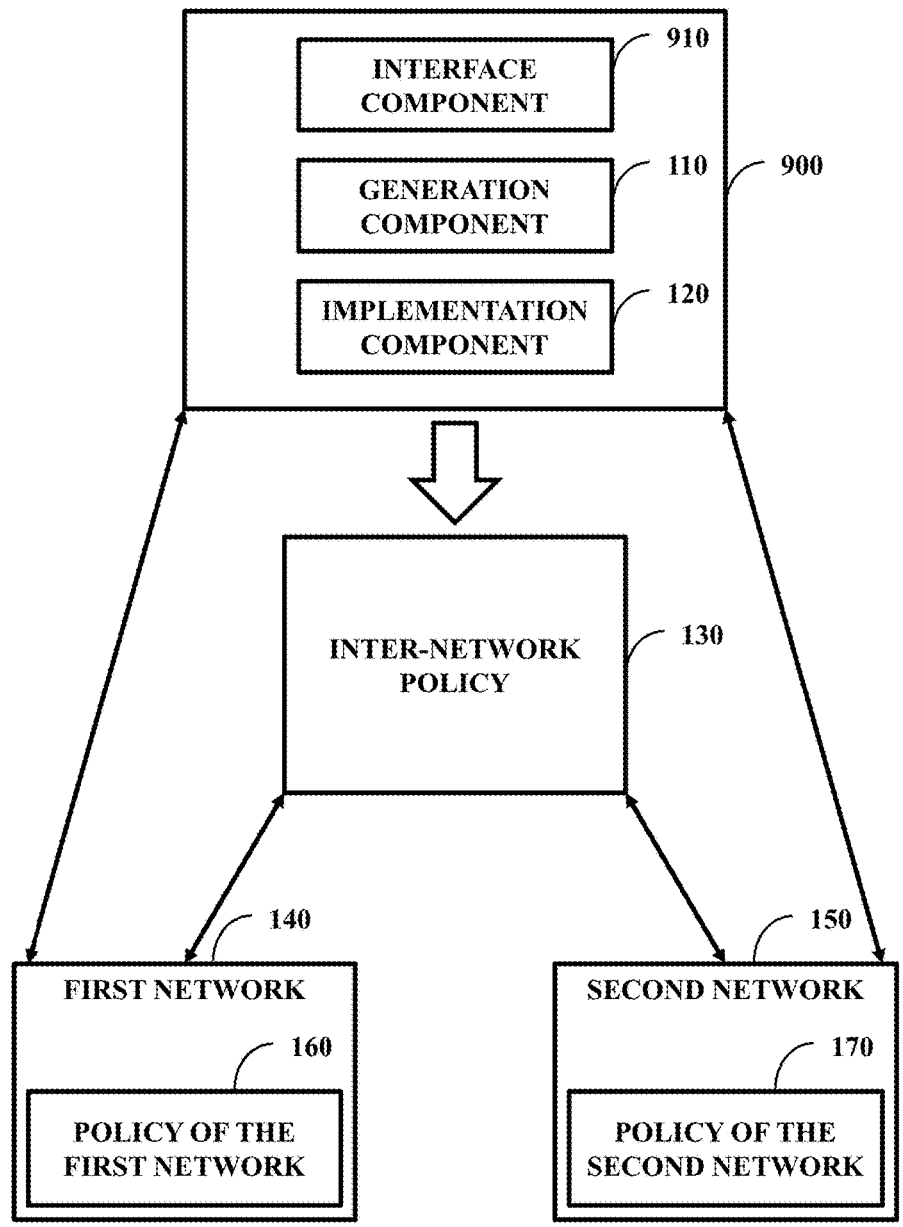
FIG. 9 illustrates one embodiment of a system comprising an interface component, the generation component, and the implementation component.

FIG. 9 illustrates one embodiment of a system 900 comprising an interface component 910, the generation component 110, and the implementation component 120. The interface component 910 is configured to cause an interface to be disclosed to the first network 140 (e.g., the interface can also be disclosed to the second network 150). The interface forces stacked command input in accordance with the inter-network policy 130. The interface can also be used for command input in accordance with the policy 160 (e.g., the interface can also be used for command input in accordance with the policy 170).

Figure 10:
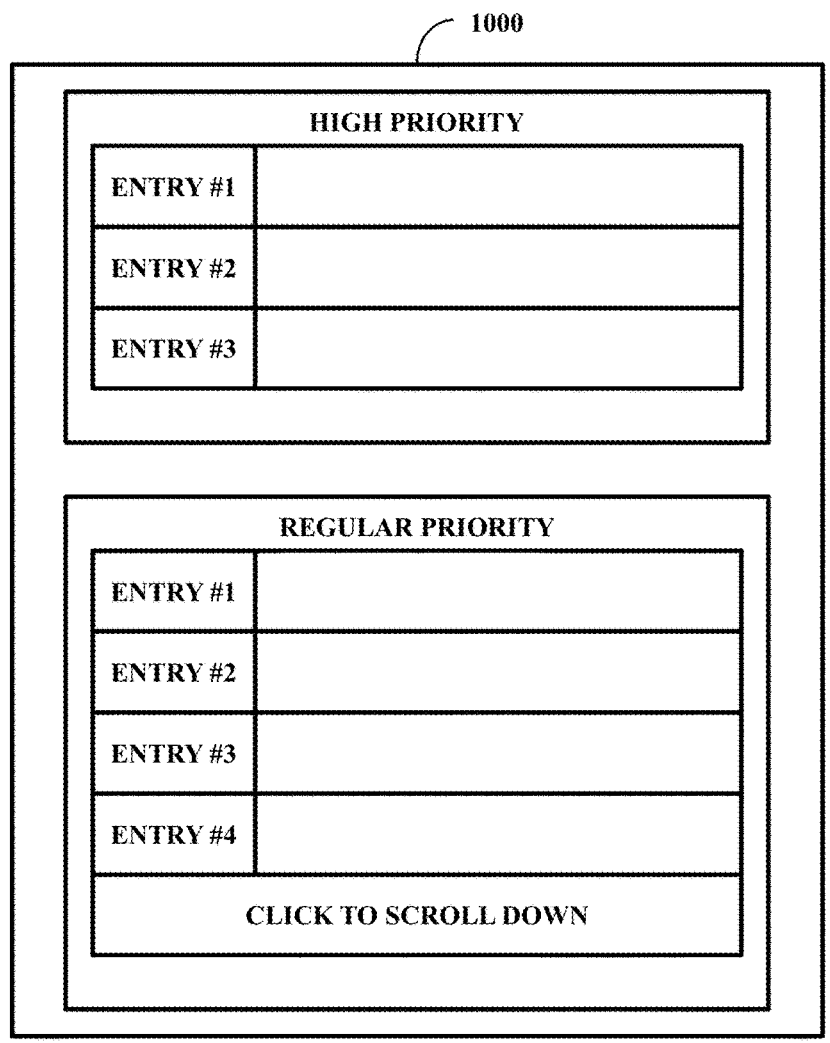
FIG. 10 illustrates one embodiment of an interface that can be caused to be disclosed by the interface component.

FIG. 10 illustrates one embodiment of an interface 1000 that can be caused to be disclosed by the interface component 910 of FIG. 9. The interface 1000 has two sections—a high priority section and a regular priority section. The inter-network policy 130 of FIG. 9 can include a rule that states messages that are listed with high priority are sent first while messages listed with regular priority are sent second. The interface 1000 can be presented on screens of computers of the first network 140 of FIG. 9 and the second network 150 of FIG. 9. The interface 1000 can be used to enter communications to be sent in accordance with the inter-network policy 130. A crafty user that desires to circumvent the inter-network policy 130 could label an unnecessarily high number of communications as high priority. In an attempt to prevent this type of circumvention, the interface 1000 can be constructed (e.g., by the interface component 910) such that a limited number of communications can be designated by high priority while remaining messages are designated as regular priority. Thus, the interface 1000 forces stacked command input (e.g., a limited number of high priority messages) and input to the interface 1000 can be saved in a non-transitory computer-readable medium.

Figure 11:
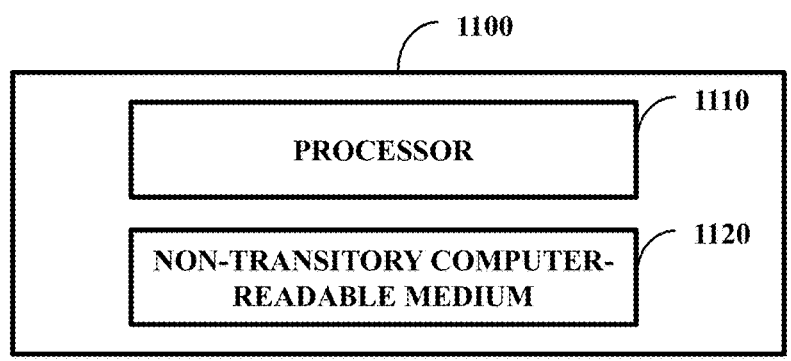
FIG. 11 illustrates one embodiment of a system comprising a processor and a non-transitory computer-readable medium.

FIG. 11 illustrates one embodiment of a system 1100 comprising a processor 1110 and a non-transitory computer-readable medium 1120. In one embodiment, the processor executes an instruction that pertains to at least one of the generation component, the implementation component, at least one other component described herein, or a combination thereof. The non-transitory computer-readable medium 1120 can be configured to store computer-executable instructions that when executed by the processor 1110 cause the processor 1110 to perform a method.

Figure 12:
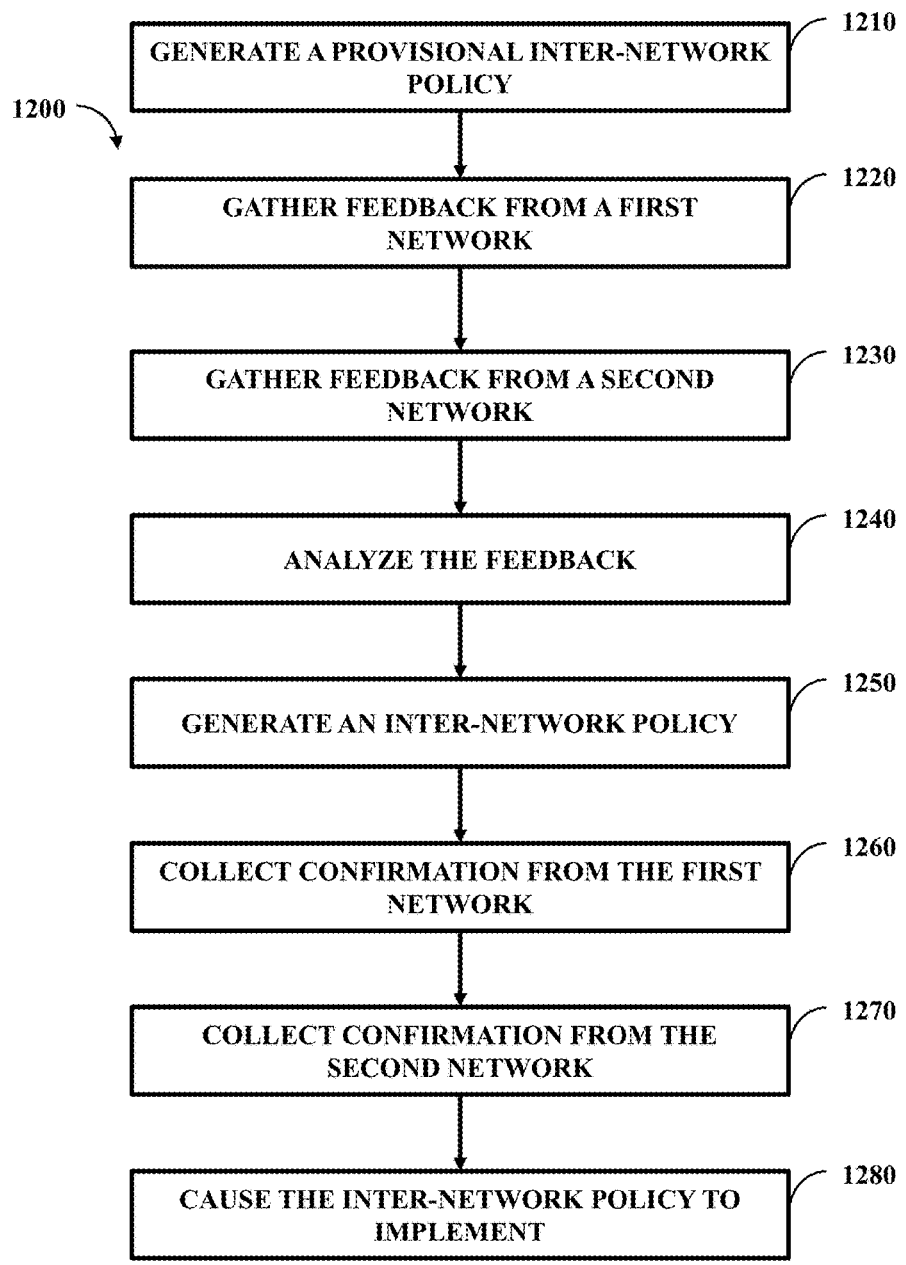
FIG. 12 illustrates one embodiment of a method that can be performed by the processor.

FIG. 12 illustrates one embodiment of a method 1200 that can be performed by the processor 1110 of FIG. 11. At 1210, a provisional inter-network policy for communication between a first network and a second network is generated (e.g., the provisional inter-network policy is stored in the computer-readable medium 1120 of FIG. 11). Feedback for the provisional inter-network policy is gathered from the first network at 1220 and from the second network at 1230. At 1240, the feedback from the first network and the feedback from the second network are analyzed to produce a feedback analysis result. At 1250, the inter-network policy is generated that governs communication between the first network and the second network that are different networks (e.g., at least partially different networks, completely different networks, etc.). The inter-network policy can be the same as or different than the provisional inter-network policy. The inter-network policy resolves a difference set between a policy of the first network and a policy of the second network. The inter-network policy is based, at least in part, on the feedback analysis result. The first network is prevented from accessing at least part of the policy of the second network while the inter-network policy is implemented (e.g., concurrent with the second network being prevented from accessing at least part of the policy of the first network while the inter-network policy is implemented). A confirmation that is an approval to use the inter-network policy is collected from the first network at 1260 and the second network 1270. At 1280, the inter-network policy is caused to implement for the first network and the second network concurrently in response to collection of the confirmation from the first network and collection of the confirmation from the second network.

In one embodiment, multiple actions discussed with regard to the method 1200 can be performed simultaneously and/or be performed as a single action. For example, the provisional inter-network policy can be generated at 1210. The provisional inter-network policy can be submitted to the first network and second network for review. The feedback gained at 1220 and 1230 can be confirmations 1260 and 1270. The provisional inter-network policy can be implemented as the inter-network policy so generation at 1210 can be the same generation that occurs at 1250.

Figure 13:
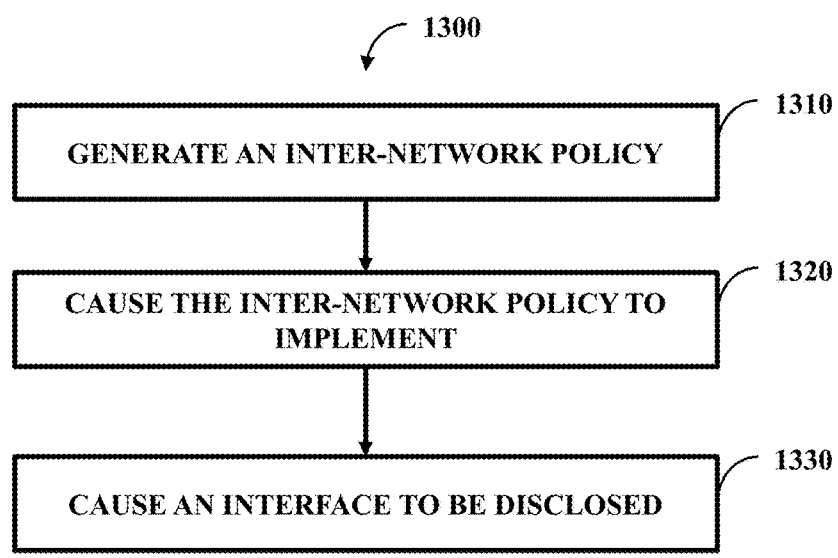
FIG. 13 illustrates one embodiment a method that can be performed by the processor.

FIG. 13 illustrates one embodiment with a method 1300 that can be performed by the processor 1110 of FIG. 11. At 1310, generating an inter-network policy occurs. The inter-network policy governs resource usage between the first network and the second network that are at least partially different networks (e.g., at least one network has at least one element not of the other network). The inter-network policy resolves a difference set between the policy of the first network and the policy of the second network. The inter-network policy is not identical to the policy of the first network nor is the inter-network policy identical to the policy of the second network. At 1320, the inter-network policy is caused to implement for the first network and the second network concurrently. At 1330, an interface (e.g., the interface 1000 of FIG. 10) is caused to be disclosed to the first network (e.g., a copy of the interface is disclosed to the first network while another copy of the interface is disclosed to the second network). The interface provides information on use of a resource of the second network in accordance with the inter-network policy and where the interface forces command input in accordance with the inter-network policy.

Inter-Network Policy Rule Definition/Determination

As described above, an inter-network policy (also known as a dynamic policy negotiation) may be used to control and resolve communication between two disparate networks 140 and 150. Determining which elements of which network policy (e.g., policy 160 or policy 170) should be utilized and/or creating a new policy based on policies 160 or 170 may be performed dynamically and automatically (e.g., without additional user input). One or more embodiments of the invention base the determination of the inter-network policy on defeasible logic. In this regard, the policies 160 and 170 (as well as policy 130) may be represented in defeasible logic and composition is based on rules for defeasible inference. Such an approach is computationally efficient (i.e., conclusions/defeasible logic proofs can be generated in linear time), models human reasoning, and is in a natural setting (e.g., the syntax of defeasible logic allows one to define (in a natural way) the concepts of alternative choices, conditioning the requirements to circumstances, introducing priority to establish preference and conditions for compromise.

There are three types of rules in defeasible logic: strict rules, defeasible rules, and defeater rules.

Strict rules resolve A→p, and are interpreted in the classical sense: whenever the premises (p) are indisputable, then so is the conclusion. An example of a strict rule is "Professors are faculty members", written:

$$professor(X) \rightarrow faculty(X)$$

Strict rules are intended to define relationships that are definitional in nature, for example, ontological knowledge.

Defeasible rules resolve A⇒ p, when all the literals in A are true, then normally or typically, p is true and can be defeated by contrary evidence. An example of a defeasible rule is:

$$faculty(X) \Rightarrow tenured(X)$$

which reads as "Faculty are typically tenured."

Defeater rules resolve A~>p, when all the literals in A are true, one should not normally conclude that p is true. This rule is used only to prevent some conclusions, not to actively support conclusions. An example of such a defeater is:

$$assistantant\text{-}prof(X) \sim> \neg tenured(X)$$

which reads "Assistant professors may not be tenured."

Figure 14:
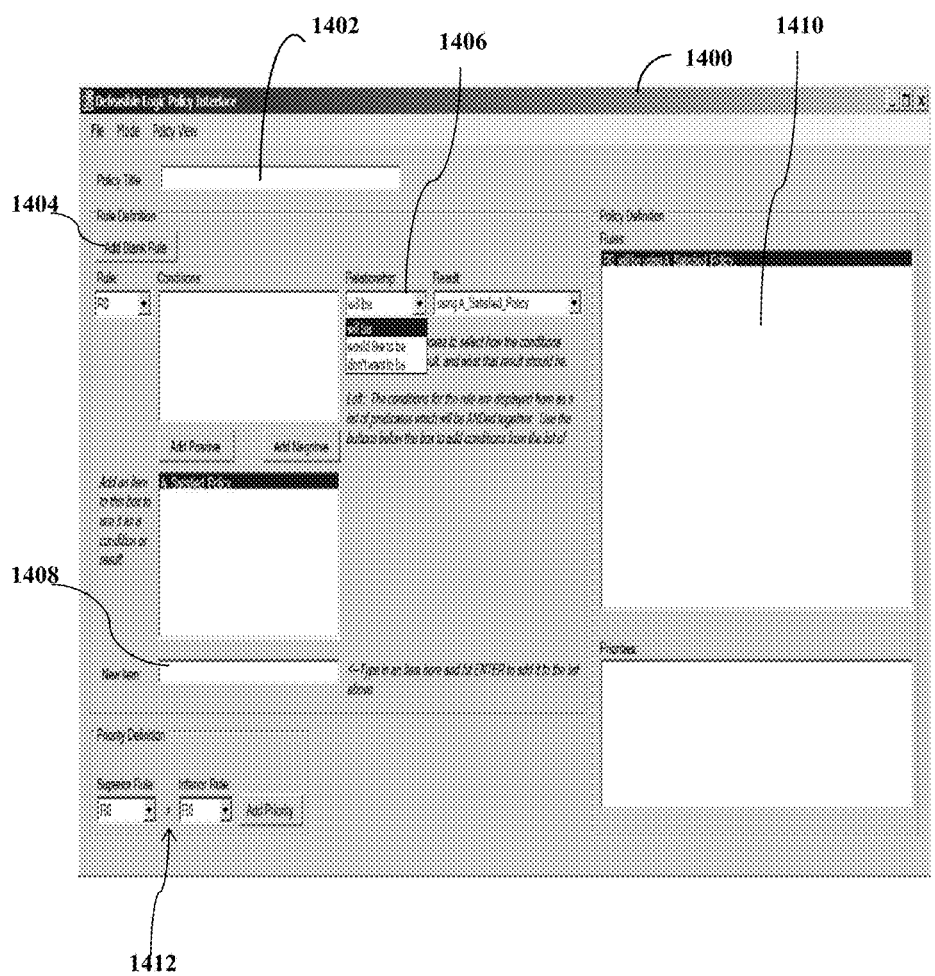
FIG. 14 illustrates an exemplary graphical user interface 1400 that provides a defeasible logic policy editor in accordance with one or more embodiments of the invention.

A superiority relation (>) on rules may be represented as R2>R1 to expresses that R2 may override R1. As an example:

R1: professor(X)⇒ tenured(X)
R2: visiting(X)⇒ tenured(X)
R2>R1: visiting professor not tenured A defeasible logic policy editor may provide a graphical user interface for users to work with rules (e.g., enter, create, edit, view, etc.). FIG. 14 illustrates an exemplary graphical user interface 1400 that provides a defeasible logic policy editor in accordance with one or more embodiments of the invention. The name/title of the policy is entered in text box 1402. A rule may be introduced by selecting the "Add Blank Rule" button 1404. The three types of rules (strict [will be], defeasible [would like to be], and defeater [don't want to be]) can be specified in the relationship drop down menu 1406. Variables may be introduced/entered in text box 1408 and the pseudo-English form of the resulting rule can be displayed in area 1410. In addition the priority relations/ definitions may be introduced/specified in area 1412.

An exemplary policy negotiation scenario is that negotiation between two forces (Force one and Force Two) with an isolated connection mode. For example, the setting of the interconnection between two such forces may be as follows:

Two Paths are available: Path1, and Path2;
Only one of these paths can be used;
Connection facilities available are: Voice, and Video;
Mission application capacity requirements: there is a Pick List of 36 RF channels (Chanel1, . . . , Chanel32) and each force has its own sub-list of available channels;
The goal is to find 3 channels available to both forces that are also consistent with the other requirements;
Mission reliability requirements are: each force has access to different packages of adequate IP addresses.
Force One has the following policy:
Has access to the following 10 acceptable channels: Channel5, Channel7, Channel9, Channel12, Channel15, Channel16, Channel17, Channel23, Channel25, Channel32;
Has access to 2 packages of adequate IP addresses: IPAddressOne1, IPAddressOne2;
If it has access to Video, it cannot use Voice;
If it uses Channel9 it cannot use Video;
If it uses Channel17 it cannot use Voice;
If it uses Channel32 it cannot use Voice;
If it uses Path1 it cannot use Channel9 or Channel15 or Channel32 or IPAddressOne2;
If it uses Path2 it cannot use Channel5 or Channel17 or Channel19 or Video;
If it uses Channel5 it cannot use IPAddressOne2;
If it uses Channel15 it cannot use IPAddressOne1;
If it uses Channel17 it cannot use IPAddressOne2;
If it uses Channe32 it cannot use IPAddressOne1.

The defeasible rules created to represent the Force One's policy may include (some rules with the same patterns are not listed):

R1: ChannelSatisfied & IPSatisfied & ConnectionSatisfied & Path→Satisfied
R2: ChannelA5 & ChannelB5→Channel51
R3: Channel51→Channel71
R4: ChannelA7 & ChannelB7→Channel71
R5: ChannelA7 & ChannelB7 & Channel51→Channel72
R6: Channel71→Channel91
R7: Channel72→Channel92
R8: ChannelA9 & ChannelB9→Channel91
R9: ChannelA9 & ChannelB9 & Channel71→Channel92
R10: ChannelA9 & ChannelB9 & Channel72→ChannelSatisfied
⋮
R41: ChannelA32 & ChannelB32→Channel321
R42: ChannelA32 & ChannelB32 & Channel251→Channel322
R43: ChannelA32 & ChannelB32 & Channel252→ChannelSatisfied
R44: IPAddressOne1→IPSatisfied
R45: IPAddressOne2→IPSatisfied
R46: UseVoice→ConnectionSatisfied
R47: UseVideo→ConnectionSatisfied
R48: Path1→Path
R49: Path2→Path
R50: { }⇒ChannelA5
R51: { }⇒ChannelA7
⋮
R59: { }⇒ChannelA32
R60: { }⇒IPAddressOne1
R61: { }⇒IPAddressOne2
R62: { }⇒UseVoice
R63: { }⇒UseVideo
R64: { }⇒Path1
R65: { }⇒Path2
R66: Path1~>not-Path2
R67: UseVideo~>not-UseVoice
R68: Path1~>not-IPAddressOne2
R69: Path2~>not-UseVideo
R70: ChannelA9~>not-UseVideo
R71: ChannelA17~>not-UseVoice
R72: ChannelA32~>not-UseVoice
R73: Path1~>not-ChannelA9
R74: Path1~>not-ChannelA15
R75: Path1~>not-ChannelA32
R76: Path2~>not-ChannelA9
R77: Path2~>not-ChannelA5
R78: Path2~>not-ChannelA17
R79: ChannelA5~>not-IPAddressOne2
R80: ChannelA15~>not-IPAddressOne1
R81: ChannelA17~>not-IPAddressOne2
R82: ChannelA32~>not-IPAddressOne1

Superiority Relations: R66>R65, R67>R62, R68>R61, R69>R63, R70>R63, R71>R62, R72>R62, R73>R52, R74>R54, R75>R59, R76>R52, R77>R50, R78>R56, R78>R56, R79>R61, R80>R60, R81>R61, R79>R60

Force Two has the following policy:

Has access to the following 11 acceptable channels: Channel4, Channel7, Channel8, Channel9, Channel12, Channel13, Channel16, Channel19, Channel23, Channel25, Channel34;

Has access to 2 packages of adequate IP addresses: IPAddressTwo1, IPAddressTwo2, IPAddressTwo3;

If it has access to Video, it cannot use Voice;
If it uses Channel9 it cannot use Video;
If it uses Channel17 it cannot use Video;
If it uses Channel32 it cannot use Voice;
If it uses Path1 it cannot use Channel9 or Channel19 or Channel25 or IPAddressTwo3;
If it uses Path2 it cannot use Channel7 or Channel16 or Channel19 or Video;
If it uses Channel19 it cannot use IPAddressTwo2;
If it uses Channel16 it cannot use IPAddressTwo3;
If it uses Channel25 it cannot use IPAddressTwo2;
If it uses Channel34 it cannot use IPAddressTwo1.

The defeasible rules created to represent the Force Two's policy may include:

R1: ChannelSatisfied & IPSatisfied & ConnectionSatisfied & Path→Satisfied
R2: IPAddressTwo1→IPSatisfied
R3: IPAddressTwo2→IPSatisfied
R4: IPAddressTwo3→IPSatisfied
R5: UseVoice→ConnectionSatisfied
R6: UseVideo→ConnectionSatisfied
R7: Path1→Path
R8: Path2→Path
R9: { }=>ChannelB4
R10: { }=>ChannelB7
:
R19: { }=>ChannelB34
R20: { }=>IPAddressTwo1
R21: { }=>IPAddressTwo2
R22: { }=>IPAddressTwo2
R23: { }=>UseVoice
R24: { }=>UseVideo
R25: { }=>Path1
R26: { }=>Path2
R27: Path1~>not-Path2
R28: UseVideo~>not-UseVoice
R29: Path1~>not-IPAddressTwo3
R30: Path2~>not-UseVideo
R31: ChannelB9~>not-UseVideo
R32: ChannelB17~>not-UseVoice
R33: ChanneBA32~>not-UseVoice
R34: Path1~>not-Channelb9
R35: Path1~>not-Channelb19
R36: Path1~>not-ChannelB25
R37: Path2~>not-ChannelB7
R38: Path2~>not-ChannelB16
R39: Path2~>not-ChannelB19
R40: ChannelB19~>not-IPAddressTwo2
R41: Channelb16~>not-IPAddressTwo3
R42: ChannelB25~>not-IPAddressTwo2
R43: ChannelB34~>not-IPAddressTwo1

Superiority Relations: R27>R26, R28>R23, R29>R22, R30>R24, R31>R24, R32>R23, R33>R23, R34>R12, R35>R16, R36>R18, R37>R10, R38>R15, R39>R16, R40>R21, R41>R22, R42>R21, R43>R20

Once the above defeasible rules are combined the defeasible logic engine will produce the following results, which is the best conclusion consistent with all rules and superiority relations:

Path1
Video
Channel12
Channel16
Channel23
IPAddressOne1
IPAddressTwo2

Thus, the results above are consistent with both policies. In other words, embodiments of the invention provide a tool that utilizes defeasible logic to combine the policies of two organizations. The result is the "best" set of rules or rules that are consistent with both policies. In the case where no common ground exists, the tool may inform the operators of the conflict. Thus, the tool finds a set of rules that are consistent with both policies and maximizes the set using superiority relations.

Figure 15:
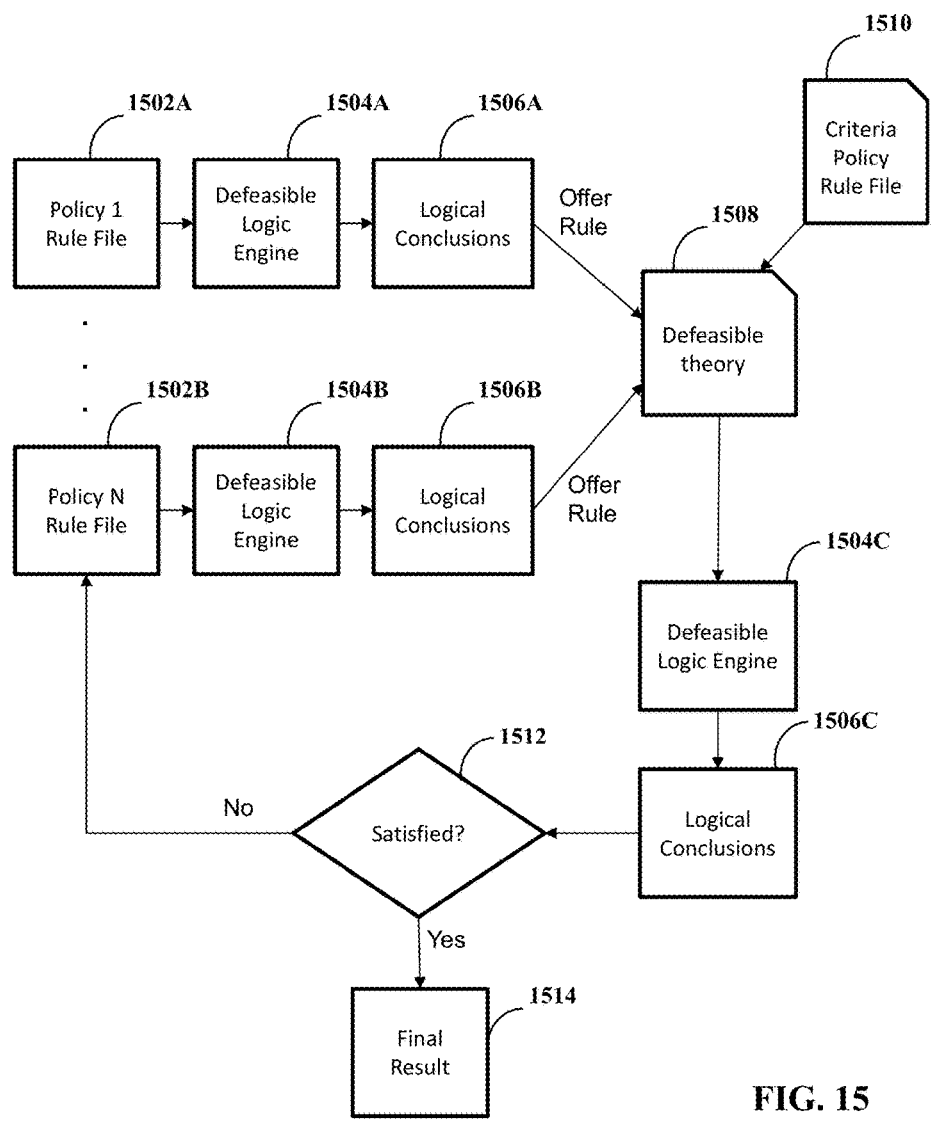
FIG. 15 illustrates the logical flow for the structure of the negotiation tool in accordance with one or more embodiments of the invention.

FIG. 15 illustrates the logical flow for the structure of a negotiation tool in accordance with one or more embodiments of the invention. The policy editor is used to create the policies for each of the organizations (including the rules in each policy), and outputs a rule file 1502A and 1502B for each policy (i.e., policy 1 to policy N). Each rule file 1502 is fed to a defeasible logic engine 1504 (i.e., engines 1504A and 1504B) which outputs logical conclusions 1506A and 1506B. The resulting offer rules are combined into a defeasible theory 1508 that represents the union of the rule files 1502. As illustrated, the files 1502A and 1502B may be joined based on a criteria policy set forth in a criteria policy rule file 1510. The defeasible theory 1508 is processed by another defeasible logic engine 1504C to provide logical conclusions 1506C. If the logical conclusions 1506C are satisfactory (as determined at step 1512), the final result is complete at 1514. If the logical conclusions 1506C are not satisfactory, the process repeats again (e.g., with policy rule files 1502). One of the rule files 1502 used at stage may include the union at 1508.

Figure 16:
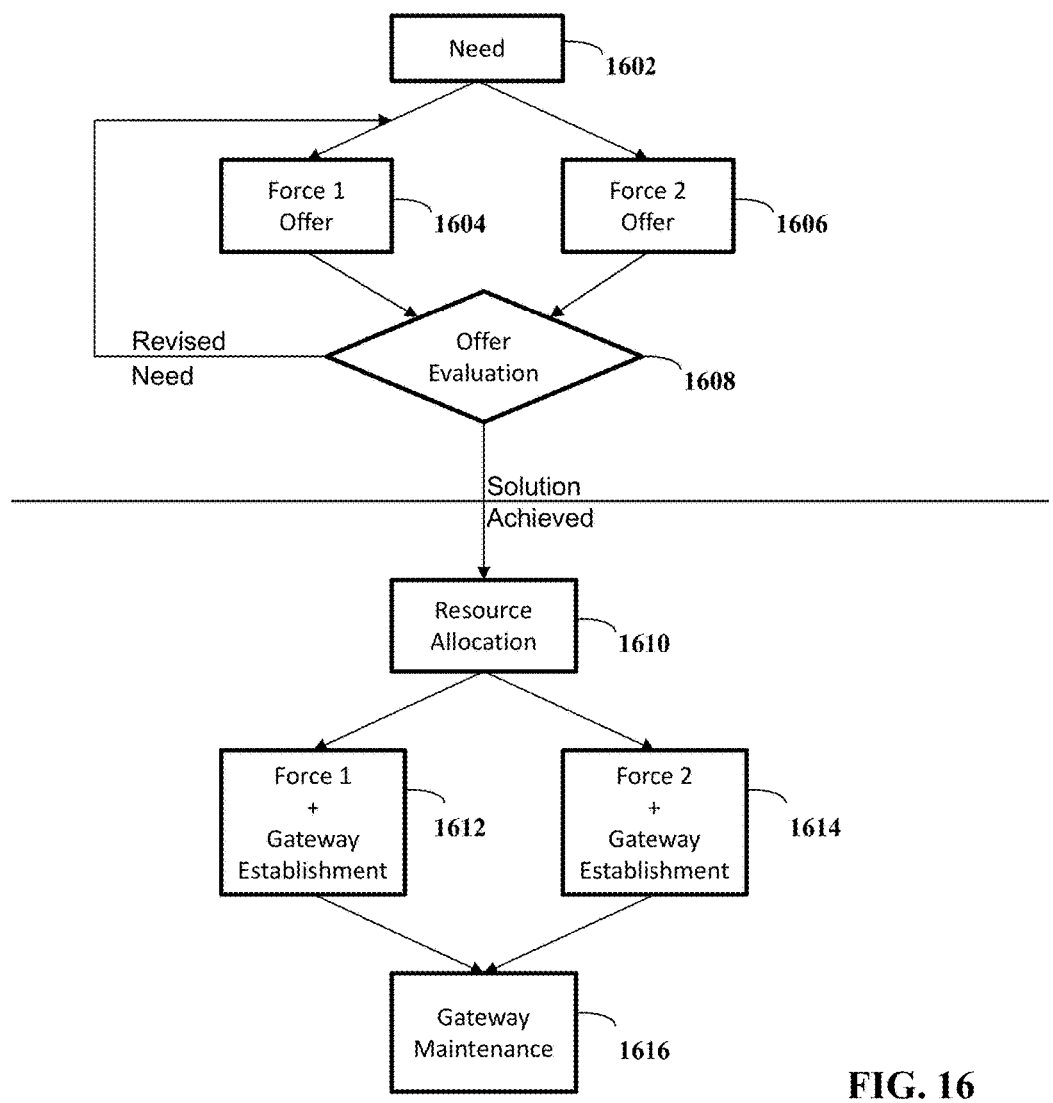
FIG. 16 illustrates the dynamic policy negotiation process for resource negotiation and allocation in accordance with one or more embodiments of the invention.

FIG. 16 illustrates the dynamic policy negotiation process for resource negotiation and allocation in accordance with one or more embodiments of the invention. There are two phases: (1) the resource negotiation phase; and (2) the resource allocation phase. In the resource negotiation phase, the needed resources are evaluated and negotiated. The resources are then allocated in the resource allocation phase. More specifically, a need 1602 for a resource is provided to various resources where offers 1604 and 1606 are forced/requested. By forcing an offer, the system of the invention may require user input based on a requested resource. The offers are then evaluated at 1608. If the offers 1604/1606 fail to satisfy the requested need 1602, the system indicates a revised offer is needed and the process returns to acquire/force new offers 1604/1606. If the solution is achieved by one or more of the offers 1604/1606, the process proceeds to the resource allocation phase.

In the resource allocation phase a resource is allocated at 1610. A gateway 1612/1614 to communicate with the allocated resource from the particular network/organization (e.g., organization 1 and/or organization 2) is established. Further, gateway maintenance 1616 may be provided to ensure that communication with the resource via the gateway is maintained.

In view of the above, given a setting/scenario (having various parameters) in which a communication between two (or more) different entities is desired, where each entity has a different network policy (consisting of various rules), defeasible logic is used to determine the common ground between the two policies that can be used within the parameters of the setting/scenario. This common ground is referred to as the inter-network policy that is then used to conduct the desired communication. Such an internetwork policy can be used to define the means of communication (e.g., the channel over which communication is conducted) as well as to control the messaging within such a channel/means of communication.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system, comprising:
a generation component and an implementation component embed in a memory;
the generation component configured to proactively automatically, without user action, dynamically generate an inter-network policy that governs a relationship between a first network and a second network, wherein:
the inter-network policy is a new communication policy;
the inter-network policy governs how communications between the first network and the second network are handled;
the inter-network policy governs resource allocation;
the inter-network policy resolves a difference set between a communication policy of the first network and a communication policy of the second network;
the difference set comprises a difference between a first communication priority of the first network and a first communication priority of the second network;
the first communication priority determines a prioritization between different types of communications;
the different types of communications are based on what the communication relates to;
the first network and second network are different disparate networks; and
the implementation component configured to cause the inter-network policy to implement for the first network and the second network concurrently, wherein the implemented inter-network policy enables and controls communication between the first network and the second network;
a recognition component configured to recognize a circumstance change for the first network, the second network, the communication policy of the first network, the communication policy of the second network, the inter-network policy, or a combination thereof;
an evaluation component configured to perform an evaluation of the circumstance change on how the circumstance change impacts the inter-network policy;
a change component configured to make a determination on if the inter-network policy should be changed and configured to make a determination on how to change the inter-network policy in response to the determination on if the inter-network policy should be changed being positive, wherein the determination on if the inter-network policy should be changed is based on a result of the evaluation and wherein the determination on how to change the inter-network policy is based on the result of the evaluation; and
a modification component configured to modify the inter-network policy in accordance with the determination on how to change the inter-network policy.

2. The system of claim 1, further comprising:
a mask component configured to prevent the first network from accessing at least part of the communication policy of the second network while the inter-network policy is implemented, wherein the mask component keeps information about the at least part of the communication policy of the second network secret from the first network.

3. The system of claim 2, wherein the mask component is configured to prevent the second network from accessing at least part of the communication policy of the first network while the inter-network policy is implemented concurrent with prevention of the first network from accessing at least part of the communication policy of the second network while the inter-network policy is implemented.

4. The system of claim 1, further comprising:
an analysis component configured to perform an analysis of the communication policy of the first network and of the communication policy of the second network, and
a selection component configured to make a selection of a content of the inter-network policy, where the selection is based, at least in part, on a result of the analysis and wherein the generation component proactively generates the inter-network policy with the content.

5. The system of claim 4, further comprising:
an identification component configured to perform an identification of a difference of the difference set that is irresolvable by the generation component, wherein the result of the analysis is used to make the identification; and
a notification component configured to produce a notification that includes information on the difference of the difference set that is irresolvable by the generation component.

6. The system of claim 4, wherein:
the content comprises a policy element of the inter-network policy;
the policy element of the inter-network policy differs from a corresponding policy element of the communication policy of the first network; and
the policy element of the inter-network policy differs from a corresponding policy element of the communication policy of the second network.

7. The system of claim 4, wherein:
the content comprises a policy element of the inter-network policy;
the policy element of the inter-network policy is the same as a policy element of the communication policy of the first network; and
the policy element of the policy of the first network has a difference that is part of the difference set with a corresponding policy element of the communication policy of the second network.

8. The system of claim 4, wherein:
the selection component employs an algorithm to make a determination of an optimal content for the content of the inter-network policy;
the determination is based, at least in part, on the communication policy of the first network and the communication policy of the second network; and
the selection component is configured to make a selection of optimal content as the content of the inter-network policy.

9. The system of claim 4, wherein the content comprises a traffic flow agreement for regulation of traffic among the first network and the second network.

10. The system of claim 4, wherein the content comprises capability information of the first network that is available to the second network and capability information of the second network that is available to the first network.

11. The system of claim 1, wherein the inter-network policy comprises a rule that regulates use of a resource of the first network by the second network, wherein the rule determines how much bandwidth of the first network to allocate to the second network based on the different types of communications being conducted by users of the first network and the second network.

12. The system of claim 1, further comprising:
a detection component configured to detect a communication construct between the first network and the second network, wherein the generation component is configured to operate in response to detection of the communication construct.

13. The system of claim 1, wherein:
the first network follows the policy of the first network for a first network intra-network communication when the inter-network policy is implemented;
the first network follows the inter-network policy for an inter-network communication when the inter-network policy is implemented; and
the communication policy of the first network and the inter-network policy are not identical.

14. The system of claim 1, further comprising:
an interaction component configured to receive a first confirmation from the first network and to receive a second confirmation from the second network, wherein the implementation component causes the inter-network policy to implement for the first network and the second network concurrently in response to reception of the first confirmation and the second confirmation.

15. The system of claim 1, wherein the difference set comprises a difference between a first communication priority of the first network and a first communication priority of the second network.

16. The system of claim 1, further comprising:
an interface component configured to cause an interface to be disclosed to the first network, wherein the interface forces stacked command input in accordance with the inter-network policy.

17. The system of claim 1, further comprising:
a feedback component configured to:
gather a first feedback from the first network on a proposed inter-network policy; and
gather a second feedback from the second network on the proposed inter-network policy;
wherein:
the generation component is configured to generate the proposed inter-network policy;

the generation component is configured to make a modification of the proposed inter-network policy in generation of the inter-network policy; and
the modification is based on the first feedback and the second feedback.

18. A computer implemented method for controlling communication between a first network and a second network, the method comprising:
dynamically automatically, without user action, generating, within a computer via components embed in a memory, an inter-network policy, wherein:
the inter-network policy is a new communication policy;
the inter-network policy governs how communications between the first network and the second network are handled;
the inter-network policy governs resource usage between the first network and the second network;
the inter-network policy resolves a difference set between a communication policy of the first network and a communication policy of the second network;
the difference set comprises a difference between a first communication priority of the first network and a first communication priority of the second network;
the first communication priority determines a prioritization between different types of communications;
the different types of communications are based on what the communication relates to; and
the first network and second network are different disparate networks;
implementing the inter-network policy for the first network and the second network concurrently, wherein the implementing enables and controls communication between the first network and the second network;
disclosing an interface to the first network, wherein:
the interface provides information on use of a resource of the second network in accordance with the inter-network policy; and
the interface forces command input in accordance with the inter-network policy;
recognizing a circumstance change for the first network, the second network, the communication policy of the first network, the communication policy of the second network, the inter-network policy, or a combination thereof;
evaluating the circumstance change on how the circumstance change impacts the inter-network policy;
determining if the inter-network policy should be changed and determining how to change the inter-network policy in response to a positive determination that the inter-network policy should be changed, wherein the positive determination on if the inter-network policy should be changed is based on a result of the evaluating and wherein the determining on how to change the inter-network policy is based on the result of the evaluating; and
modifying the inter-network policy in accordance with the determining how to change the inter-network policy.

19. A non-transitory computer-readable medium configured to store computer-executable instructions in a memory, that when executed by a processor cause the processor to perform a method, the method comprising:
dynamically generating a provisional inter-network policy for communication between a first network and a second network;

gathering a feedback from the first network, where the feedback from the first network is for the provisional inter-network policy;

gathering a feedback from the second network, where the feedback from the second network is for the provisional inter-network policy;

analyzing the feedback from the first network and the feedback from the second network to produce a feedback analysis result;

generating automatically, without user action, an inter-network policy that governs communication between the first network and the second network, wherein:

the inter-network policy is a new communication policy;

the inter-network policy resolves a difference set between a communication policy of the first network and a communication policy of the second network;

the difference set comprises a difference between a first communication priority of the first network and a first communication priority of the second network;

the first communication priority determines a prioritization between different types of communications;

the different types of communications are based on what the communication relates to;

the first network and second network are different disparate networks;

the inter-network policy is based on the feedback analysis result; and the first network is prevented from accessing at least part of the communication policy of the second network while the inter-network policy is implemented;

collecting a first confirmation from the first network, where the first confirmation from the first network is approval to use the inter-network policy;

collecting a second confirmation from the second network, where the second confirmation from the second network is approval to use the inter-network policy; and causing the inter-network policy to implement for the first network and the second network concurrently in response to collection of the first confirmation from the first network and collection of the second confirmation from the second network.

20. The system of claim 1 wherein the generation component generates the inter-network policy using defeasible logic.

* * * * *